United States Patent Office 3,692,565
Patented Sept. 19, 1972

3,692,565
METHOD OF DEPOSITING SUBSTANCES FROM THE GAS PHASE
Bernd Lersmacher, 31 An den Weihern, 5105 Laurensburg, Aachen, Germany; Hans Jurgen Lydtin, 9 Am Goepelschacth, 519 Stolberg, Germany; and Rolf Josef Wilden, 62 Brandstrasse, 5101 Roetgen, Germany
Filed Oct. 22, 1970, Ser. No. 83,017
Int. Cl. C23c 11/00, 13/00, 17/02
U.S. Cl. 117—106 R        2 Claims

ABSTRACT OF THE DISCLOSURE

The invention relates to a method of depositing substances on a heated substrate by decomposition of gases. A highly satisfactory and fast deposition is obtained in that the thickness of the gas film at the surface of the substrate is maintained small by mechanical means.

---

The invention relates to a method of depositing substances on a heated substrate by decomposition of gaseous compounds, in which method the substrate and the decomposable gas move relative to one another.

It is known that heated substrates can have layers deposited on them which consist of material produced by decomposition of a gaseous compound. Thus, for example, pyrographite can be deposited on a substrate by pyrolytic decomposition of a gaseous hydrocarbon. In this process the partial pressure of the reacting gas must be maintained low (at about 10 torr), since otherwise soot will be formed in the gas phase, which gives rise to the deposition of soot particles on the substrate and hence to irregularity of the surface of the substrate. The necessarily low gas pressure involves that the deposition on the substrate is slow, which is a serious disadvantage for technical applications.

Swiss patent specification No. 315,895 states that the formation of solid particles in the gas phase is due to the gas film which is present at the surface of the heated substrate and separates the substrate from the gas phase. It is alleged that this film prevents the decomposition from taking place in the immediate proximity of the substrate surface and causes it to take place at some distance from this surface. Thus, before the decomposition product can reach the substrate surface, the molecules or atoms may collide and be deposited together on the substrate surface. Obviously this will occur more often as the concentration of the decomposable substance in the gas phase is higher, i.e. as the pressure of the decomposable substance is higher.

The said patent specification proposes to solve this problem by blowing the gas against the substrate surface by means of a blower. This suggestion is probably based on the theory that the thickness of the gas film (Langmuir layer) can thereby be reduced.

However, the said method does not enable the thickness of the gas film to be equally reduced at every point of the substrate surface. It is even possible that at some points the proposed step has no influence at all. Consequently the thickness of the deposited layer will vary considerably from point to point. Another disadvantage of this method is that in order to reduce the thickness of the gas film to a minimum a very large quantity of gas has to be led past the substrate at a high velocity. Hence, the efficiency of the process is low, since a far greater amount of decomposable material is led past the substrate than will actually be decomposed.

It is an object of the present invention to avoid the disadvantages of the known methods and to bring about rapid deposition which is uniform throughout the entire substrate surface to be coated.

It has been found that the thickness of the gas film at the substrate surface can be reduced and consequently the deposition of solid particles of the pyrolysis products can be prevented by the use of mechanical means.

In accordance herewith the invention relates to a method of depositing substances on a heated substrate by decomposition of gaseous compounds, in which the substrate and the decomposable gas are relatively moved, characterized in that the thickness of the gas film at the substrate surface to be coated is reduced by mechanical means.

The method may be performed by causing at least one blade to move at a high speed close past the surface of the substrate to be coated. The same effect will obviously be achieved by moving the substrate past the blade or blades or by moving both the blade or blades and the substrate.

Embodiments of arrangements by means of which the method according to the invention may be performed will now be described, by way of example, with reference to the accompanying diagrammatic drawings, in which FIG. 1 is an elevation of a first arrangement.

Figure 1:
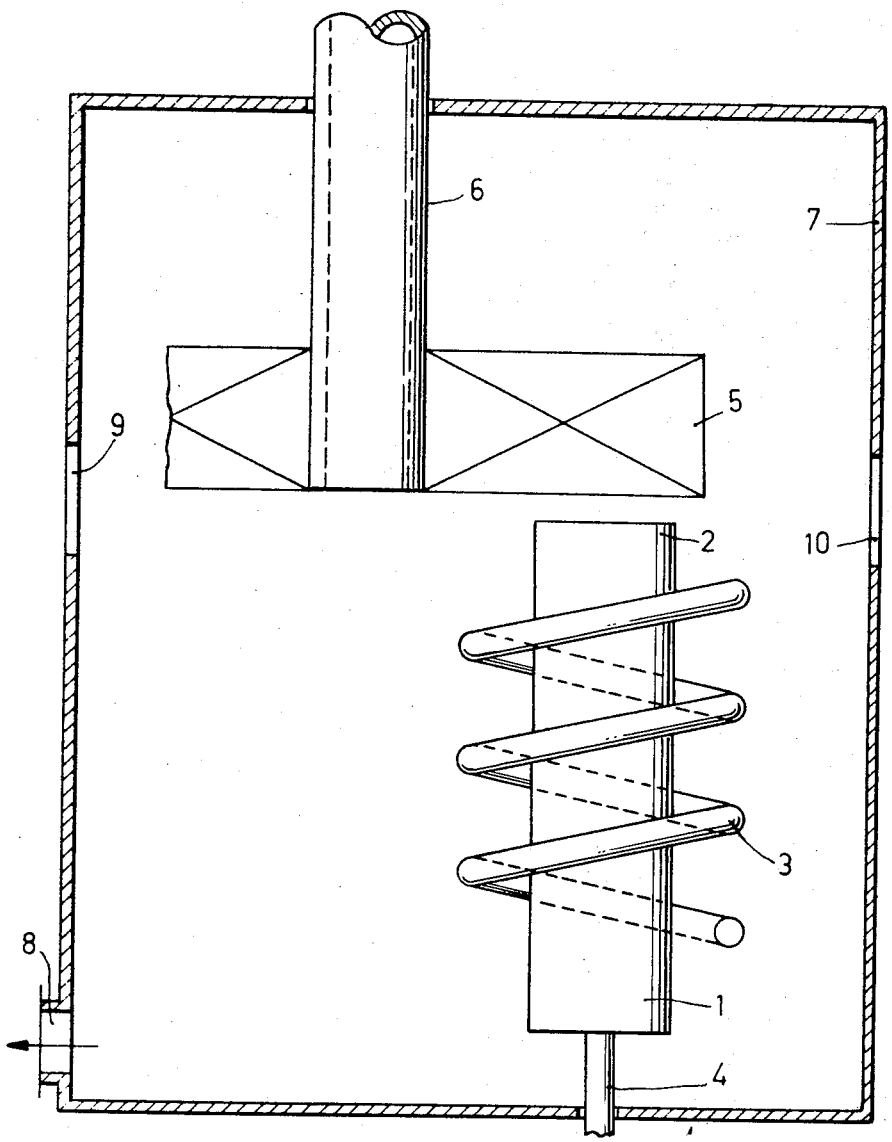

Referring now to FIG. 1, there is shown a substrate 1 a surface 2 of which is to be coated and which can be inductively heated by a coil 3. The substrate is mounted on a spindle 4 by means of which it can be rotated. A blade 5 is mounted on a rotating spindle 6. In this arrangement the spindle 6 is hollow and is used to introduce decomposable gas into a reaction space 7. A gas outlet is designated by 8. The substrate 1 is vertically displaceable. Through observation windows 9 and 10 the distance between the blade 5 and the substrate surface 2 may optically be determined.

This arrangement may be modified in various ways. The blade or blades may be provided with ducts which extend from the hollow spindle to the knife edges of the blades so as to permit a direct supply of gas to the substrate surface.

The outlet 8 may be connected to the hollow spindle so as to enable the decomposable gas to be recycled.

Figure 2:
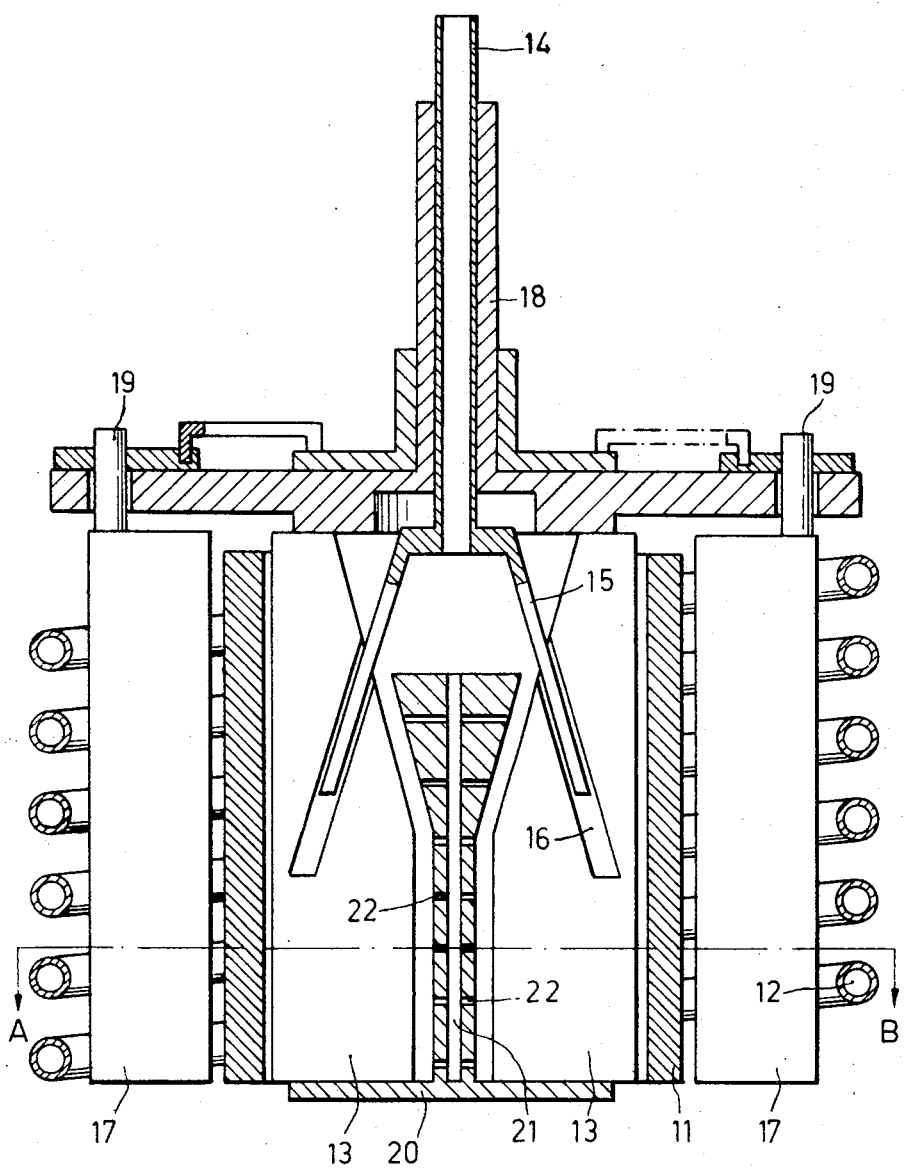
FIG. 2 is a longitudinal sectional view of a second arrangement.

FIG. 2 shows a cylindrical substrate 11 which is to be coated both internally and externally. The substrate can be inductively heated by a coil 12. Within the substrate blades 13 are provided which can be moved past the inner substrate surface by means of a rotating spindle 14. The spindle 14 and hence rods 15 mounted on it are vertically displaceable. The rods can slide in ducts 16 in the blades so that the spacing between the blades and the inner substrate surface is adjustable. The spindle 14 is hollow to enable decomposable gas to be supplied to the space enclosed by the substrate. The blades 13 are guided by a member 20 provided with a central duct 21 and with radial ducts 22 which serve to supply gas to the substrate surface. Outer blades 17 are secured to a rotating spindle 18. The blades are rotatable about pivots 19 to enable the spacing between them and the external substrate surface to be adjusted. The arrangement is enclosed in a reaction space (not shown).

Figure 3:
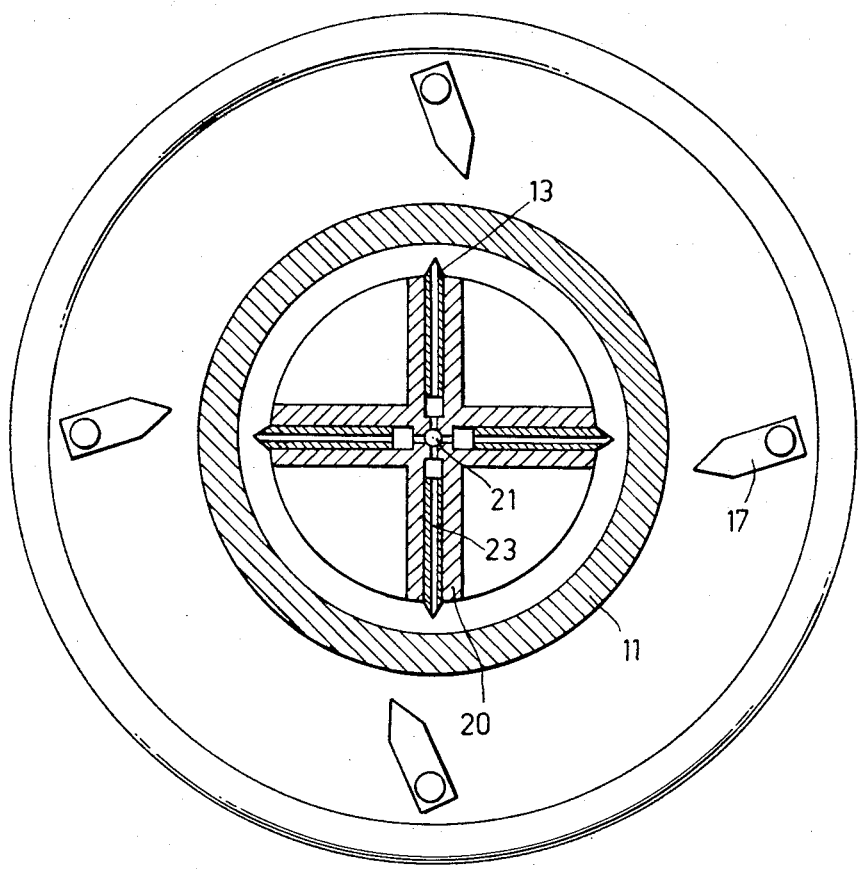
FIG. 3 is a cross-sectional view taken on the line AB.

FIG. 3 again shows the outer blades 17, the substrate 11, the guide member 20 for the inner blades 13 and the central duct 21 in the guide member, whilst a duct in a blade is designated by 23.

The advantage of the method according to the invention is that the thickness of the gas film is constant throughout the entire substrate surface to be coated. Furthermore, the thickness of the gas film can be maintained constant during the decomposition process. Another advantage is that the method according to the invention enables decomposition velocities to be attained which are higher by a factor of from 10 to 1000 than the velocities attainable with the conventional method requiring the use of a reduced pressure.

The distance by which a blade must be spaced from the substrate surface may vary between comparatively wide limits according to the gas pressure used. With pressures of from 0.001 to 100 atmospheres the spacing is set to from 1000 to $10\mu$. This spacing may vary within the said limits according to the gas used.

The substrate may be heated inductively, by radiation, by conduction or by the passage of an electric current. The temperature to which the substrate is heated may vary within wide limits according to the nature of the material to be deposited. If carbon is to be deposited, the said temperature will as a rule be chosen between 1200° C. and 2700° C., and if silicon is to be deposited, between 400° C. and 1300° C. When substrates are to be coated with silicon carbide, the temperature range will as a rule be from 800° C. to 2500° C.

The speed difference between the or each blade and the substrate may also be chosen within wide limits. In general, however, it will be between 1 m./s. and 100 m./s., the speed being increased with increased gas pressures.

The substrates on which substances may be deposited may consist of a variety of materials. Examples of such materials are tungsten, tantalum, carbon, silicon, silicon carbide, aluminium nitride, aluminium oxide and the like.

Substances capable of being deposited on substrates are, for example, carbon, boron, boron carbide, boron nitride, silicon, silicon carbide, iron, titanium boride, titanium carbide aluminium nitride and the like.

Examples of decomposable gases are $BCl_3+H_2$ for the deposition of boron, $BBr_3+CH_4$ for the deposition of boron carbide, $BCl_3+NH_3$ for the deposition of boron nitride, $SiCl_4+H_2$ for the deposition of silicon, methyl chlorosilanes$+H_2$ for the deposition of silicon carbide, iron carbonyl for the deposition of iron, $TiCl_4+BCl_3+H_2$ for the deposition of titanium boride, $AlCl_3+NH_3$ for the deposition of aluminium nitride, hydrocarbons, such as methane and ethane, and unsaturated hydrocarbons, such as ethane and acetylene, for the deposition of carbon.

The invention will now be illustrated by the following examples.

EXAMPLE I

A cylindrical carbon substrate having a diameter of 1 cm. was placed in an arrangement as shown in FIG. 1 in a modification in which gas was supplied through the blades. The arrangement was evacuated and then filled with $C_2H_4$. The $C_2H_4$ was supplied through the hollow spindle at a rate of 150 liters per minute and the pressure was maintained constant at 1 atmosphere. The substrate was inductively heated at 1200° C. The speed of the 4 blades relative to the substrate was from 5 to 7.5 m./s.; the distance between the blades and the substrate surface was $300\mu$. A carbon layer was deposited on the substrate at a rate of $600\mu$ per minute.

EXAMPLE II

A cylindrical carbon substrate having a diameter of 1 cm. was placed in the arrangement of Example I. After the air had been removed from the arrangement, the latter was filled with argon containing 1% by volume of $SiH_4$. This mixture was circulated through the hollow spindle 6 and the outlet 8 at a rate of 180 l. per minute. The gas pressure was maintained constant at 1 atmosphere. The substrate was heated at 1200° C. The four blades were moved past the substrate at a speed of from 4 to 6 m./s. at a distance from the substrate of $280\mu$. A silicon layer was deposited at a rate of $50\mu$ per minute.

What is claimed is:

1. A method of depositing substances on a heated substrate by decomposition of a gas comprising moving the decomposable gas and the substrate relative to each other while reducing the thickness of the gas film by means of at least one blade moving past the substrate the distance between said blade and said substrate being from 10 to $1000\mu$ where the gas pressure is from 100 to 0.001 atmosphere.

2. The method of claim 1 wherein the blade speed relative to the substrate surface is from 1 to 100 meters per second.

References Cited

UNITED STATES PATENTS

| | | | |
|---|---|---|---|
| 2,789,064 | 4/1957 | Schladitz | 117—106 R X |
| 3,573,888 | 4/1971 | Bogart | 117—106 R X |
| 2,897,778 | 8/1959 | Held et al. | 117—106 R X |
| 3,464,846 | 9/1969 | Mattson | 117—107.1 |

RALPH S. KENDALL, Primary Examiner

K. P. GLYNN, Assistant Examiner

U.S. Cl. X.R.

117—46 CG, 106 C, 107.2; 118—48

UNITED STATES PATENT OFFICE
CERTIFICATE OF CORRECTION

Patent No. 3,692,565 (PHN 5172)   Dated   September 19, 1972

Inventor(s)   BERND LERSMACHER ET AL

It is certified that error appears in the above-identified patent and that said Letters Patent are hereby corrected as shown below:

Column 1, line 7, after "Roetgen, Germany" insert

-- , assignors to U.S. Philips

Corporation, New York, N.Y. --.

Signed and sealed this 17th day of April 1973.

(SEAL)
Attest:

EDWARD M. FLETCHER, JR.
Attesting Officer

ROBERT GOTTSCHALK
Commissioner of Patents